US008462186B2

(12) United States Patent
Iguchi et al.

(10) Patent No.: US 8,462,186 B2
(45) Date of Patent: Jun. 11, 2013

(54) DECOLORING APPARATUS AND SHEET TRANSPORT CONTROL METHOD

(75) Inventors: Ken Iguchi, Shizuoka-ken (JP); Isao Yahata, Shizuoka-ken (JP); Takahiro Kawaguchi, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/198,597

(22) Filed: Aug. 4, 2011

(65) Prior Publication Data

US 2012/0038732 A1 Feb. 16, 2012

Related U.S. Application Data

(60) Provisional application No. 61/372,434, filed on Aug. 10, 2010.

(51) Int. Cl.
*B41J 2/325* (2006.01)
*B65H 29/62* (2006.01)
*B65H 7/02* (2006.01)

(52) U.S. Cl.
USPC ........................................................ 347/179

(58) Field of Classification Search
USPC .................. 347/101, 104, 177, 179, 218, 262, 347/264
See application file for complete search history.

(56) References Cited

U.S. PATENT DOCUMENTS

| 2011/0065056 A1 | 3/2011 | Iguchi et al. | |
| 2012/0038733 A1* | 2/2012 | Iguchi et al. | 347/179 |
| 2012/0038958 A1* | 2/2012 | Iguchi et al. | 358/505 |

OTHER PUBLICATIONS

U.S. Appl. No. 13/042,412, filed Sep. 15, 2011, Yahata, et al.

* cited by examiner

*Primary Examiner* — Huan Tran
(74) *Attorney, Agent, or Firm* — Patterson & Sheridan, LLP

(57) ABSTRACT

There is provided a decoloring apparatus including: an image reading unit; a decoloring processing unit; a transmission unit which transmits image data read by the image reading unit to a predetermined management apparatus; a receiving unit which receives a result of determination processing performed on the side of the management apparatus for the sheet from which the image data was read, based on the image data transmitted by the transmission unit; and a transport control unit which controls sheet transport time intervals for secondly or later transported sheets based on a time period from transmission of the image data of a firstly transported sheet by the transmission unit until receiving of the determination result for the firstly transported sheet by the receiving unit if the image reading unit is caused to sequentially read images on three or more sheets.

18 Claims, 14 Drawing Sheets

FIG.13

| DELAY TIME t [ msec ] | SHEET SUPPLY TIMING |
|---|---|
| 200 | ONE SECOND AFTER TRANSMISSION OF IMAGE DATA TO MANAGEMENT APPARATUS |
| 300 | TWO SECONDS AFTER TRANSMISSION OF IMAGE DATA TO MANAGEMENT APPARATUS |
| 500 | THREE SECONDS AFTER TRANSMISSION OF IMAGE DATA TO MANAGEMENT APPARATUS |

DECOLORING APPARATUS AND SHEET TRANSPORT CONTROL METHOD

CROSS-REFERENCE TO RELATED APPLICATION(S)

This application is based upon and claims the benefit of priority from: U.S. provisional application 61/372,434, filed on Aug. 10, 2010; the entire contents all of which are incorporated herein by reference.

FIELD

Embodiments described herein relate to a decoloring apparatus which decolors colors of an image formed on a sheet with decolorable colorant.

BACKGROUND

In the related art, a technique is known by which a print condition of a recording medium is read before erasing processing in an erasing apparatus, determination is made regarding whether to perform erasing processing, and transport of the recording medium to a decoloring processing unit is prohibited if the information representing that the image is not to be decolored is included in the read image.

For the decoloring apparatus in the related art, a configuration in which an image processing function and a determination function are provided in a management apparatus which can communicate with the decoloring apparatus in order to avoid the decoloring apparatus being expensive as a whole is known.

In the related art, there is a problem in that a processing ability is indefinite in variety when a PC is used as the management apparatus, for example and in that a time period until a determination result is obtained after the read image data is obtained by the management apparatus is unstable.

Therefore, a subsequent sheet is supplied after the image on the sheet is read and determination processing by a determination unit in the management apparatus is then completed, in the related art.

However, there is a problem in terms of throughput in the configuration in the related art in which the subsequent sheet supply is performed after waiting for the completion of the determination processing by the management apparatus.

DESCRIPTION OF THE DRAWINGS

FIG. 13 shows an example of a data table referred to by a control unit when a third sheet or later is supplied.

DETAILED DESCRIPTION

According to an embodiment, a decoloring apparatus generally includes an image reading unit, a decoloring processing unit, a transmission unit, a receiving unit, and a transport control unit.

The image reading unit reads an image on a transported sheet.

The decoloring processing unit is positioned further on a downstream side than the image reading unit in the sheet transport direction and decolors colors of the image formed on the sheet with decolorable colorant.

The transmission unit transmits image data read by the image reading unit to a predetermined management apparatus.

The receiving unit receives a determination result of the determination processing performed on the side of the management apparatus regarding whether to perform the decoloring processing by the decoloring processing unit on the sheet for which the image data was read, based on the image data transmitted by the transmission unit.

The transport control unit controls sheet transport time intervals for secondly or later transported sheets based on the time period from the transmission of the image data for the firstly transported sheet from the transmission unit until the receiving of the determination result for the firstly transported sheet by the receiving unit when the images on the three or more sheets are sequentially read by the image reading unit.

Hereinafter, description will be made of an embodiment with reference to the drawings.

Figure 1:
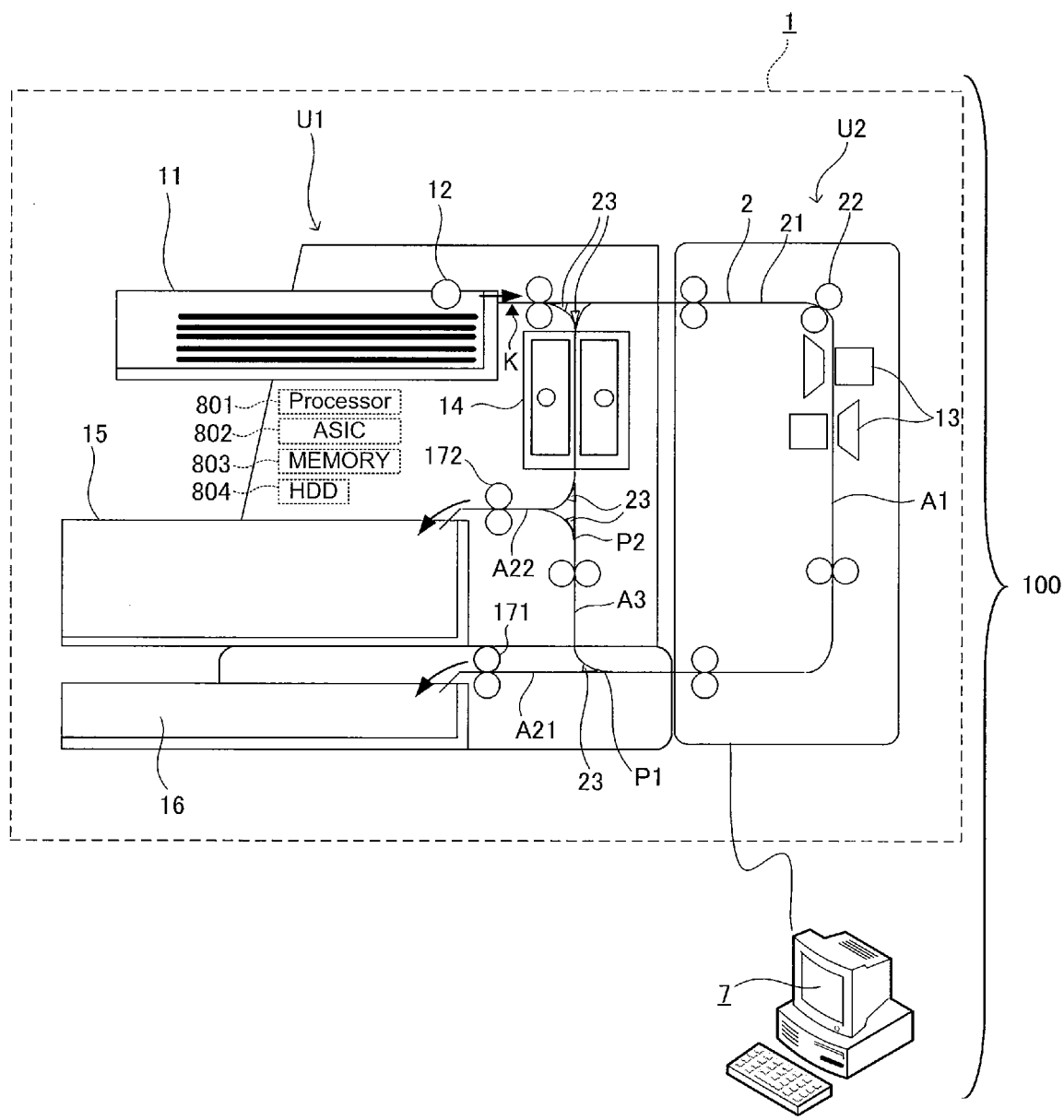
FIG. 1 is a diagram showing a decoloring system.

FIG. 1 is a diagram showing a decoloring system 100.

The decoloring system 100 includes a decoloring apparatus 1 and a management apparatus 7 connected to the decoloring apparatus 1 so as to be able to communicate with each other. The decoloring apparatus 1 and the management apparatus 7 are connected to each other by a data bus or the like, for example.

The decoloring apparatus 1 is configured by a unit U1 and a unit U2 detachably attached to the rear surface of the unit U1.

The decoloring apparatus 1 includes a sheet supply tray 11, a sheet supply unit 12, a transport path 2, an image reading unit 13, a decoloring processing unit 14, a reusable sheet tray 15, a non-reusable sheet tray 16, a discharge unit 171, a discharge unit 172, a processor 801, an ASIC 802, a memory 803, and an HDD 804 as a whole.

Here, the sheet supply tray 11, the sheet supply unit 12, the decoloring processing unit 14, the reusable sheet tray 15, the non-reusable sheet tray 16, the discharge unit 171, the discharge unit 172, the processor 801, the ASIC 802, the memory 803, the HDD 804 are provided on the side of the unit U1, for example.

In addition, the image reading unit 13 is provided on the side of the unit U2.

The sheet supply tray 11 loads sheets with various sizes such as A4, A3, B5, and the like. Here, it is assumed that the sheet supply tray 11 contains sheets on each of which an image is formed with decolorable colorant whose color is decolored when heated up to a predetermined temperature or higher.

The sheet supply unit 12 includes a pick-up roller, a sheet supply roller, and a separation roller and supplies the sheet on the sheet supply tray 11 to the transport path 2.

The transport path 2 is for transporting the sheet to each part of the decoloring apparatus 1. The transport path 2 includes a ring-shaped transport path A1 which can transport the sheet supplied from the sheet supply unit 12 to the image reading unit 13, the decoloring processing unit 14, and the image reading unit 13 in this order. There are branch points P1 and P2 which branch into discharge transport paths A21 and A22 for discharging sheets and decoloring transport path A3 for transporting sheets to the decoloring processing unit 14 on the side of the downstream of the image reading unit 13 in the sheet transport direction in the transport path 2.

The downstream of the decoloring processing unit 14 in the sheet transport direction meets between the sheet supply unit 12 and the image reading unit 13 in the transport path 2. The transport path 2 includes a transport guide 21 which guides the sheet in the transport direction, a plurality of transport rollers 22 which transports the sheet to the downstream in the transport direction, and a plurality of flappers 23 which sorts the sheets into one of the branch paths at each branch point.

The image reading unit 13 is provided on the downstream side of the sheet supply unit 12 in the transport path 2 to read an image on a sheet. Two image reading units 13 for reading the front surface and the rear surface of the sheet are provided so as to be able to simultaneously read the images on the front and rear surfaces of the sheet. For example, a CCD (Charge Coupled Device) can be employed as an image reading unit 13.

The decoloring processing unit 14 is provided on the downstream side of the image reading unit 13 in the transport path 2 and erasing an image formed on the sheet with decolorable colorant by heating the sheet up to the predetermined color-erasing temperature. Two decoloring processing units 14 for erasing the colors on the front surface and the rear surface of the sheet are provided so as to be able to decolor (color erase) the colors of the images on both sides of the sheet during one time transport.

The reusable sheet tray 15 contains reusable sheets, the colors of the images on which were decolored.

The non-reusable sheet tray 16 contains non-reusable sheets, the colors of the images on which were not sufficiently decolored.

It is matter of course that the receiving targets of the sheets can be switched between the reusable sheet tray 15 and the non-reusable sheet tray 16 or another tray can be set as one of the sheet discharge destinations if another tray can be additionally provided. Such setting information for sorting is stored in the HDD 804, for example.

The discharge units 171 and 172 are provided with discharge rollers and discharges sheets to the trays 15 and 16.

The management apparatus 7 receives image data of a sheet form the decoloring apparatus 1 and makes determination regarding decolorability for determining whether or not prohibition data such as confidential data for which decoloring is to be prohibited is included in the image data. In addition, the management apparatus 7 receives image data of the sheet, the color on which was decolored, from the decoloring apparatus 1 and makes determination regarding reusability for determining whether or not the sheet is reusable based on the state of the color remaining on the sheet.

Since it is not possible to reuse a sheet on which data such as confidential data was printed if color remains after the decoloring, it is necessary to perform determination regarding whether or not the decoloring was completed.

The processor 801 plays a role in performing various kinds of processing in the decoloring apparatus and also plays a role in realizing various functions by executing the programs stored in the memory 803, the HDD 804, and the like. In addition, it is needless to say that the processor 801 can be realized by a CPU (Central Processing Unit) or an MPU (Micro Processing Unit) which can execute the equivalent computation processing. Moreover, a storage apparatus such as a flash memory or the like can be used instead of the HDD 804 in the same manner.

The memory 803 can be configured by a RAM (Random Access Memory), a ROM (Read Only Memory), a DRAM (Dynamic Random Access Memory), a SRAM (Static Random Access Memory, a VRAM (Video RAM), a flash memory, or the like and plays a role in storing various kinds of information and programs used in the decoloring apparatus.

Although the description was made of a configuration in which the processor 801, the ASIC 802, the memory 803, and the HDD 804 are provided in the unit U1 in this embodiment, the exemplary embodiment is not limited thereto. That is, each function may be arranged in any unit, and the unit U2 may also be provided with a processing function such as that of the unit U1 as long as the functions to be provided in the decoloring apparatus can be realized by the decoloring apparatus as a whole.

Figure 2:
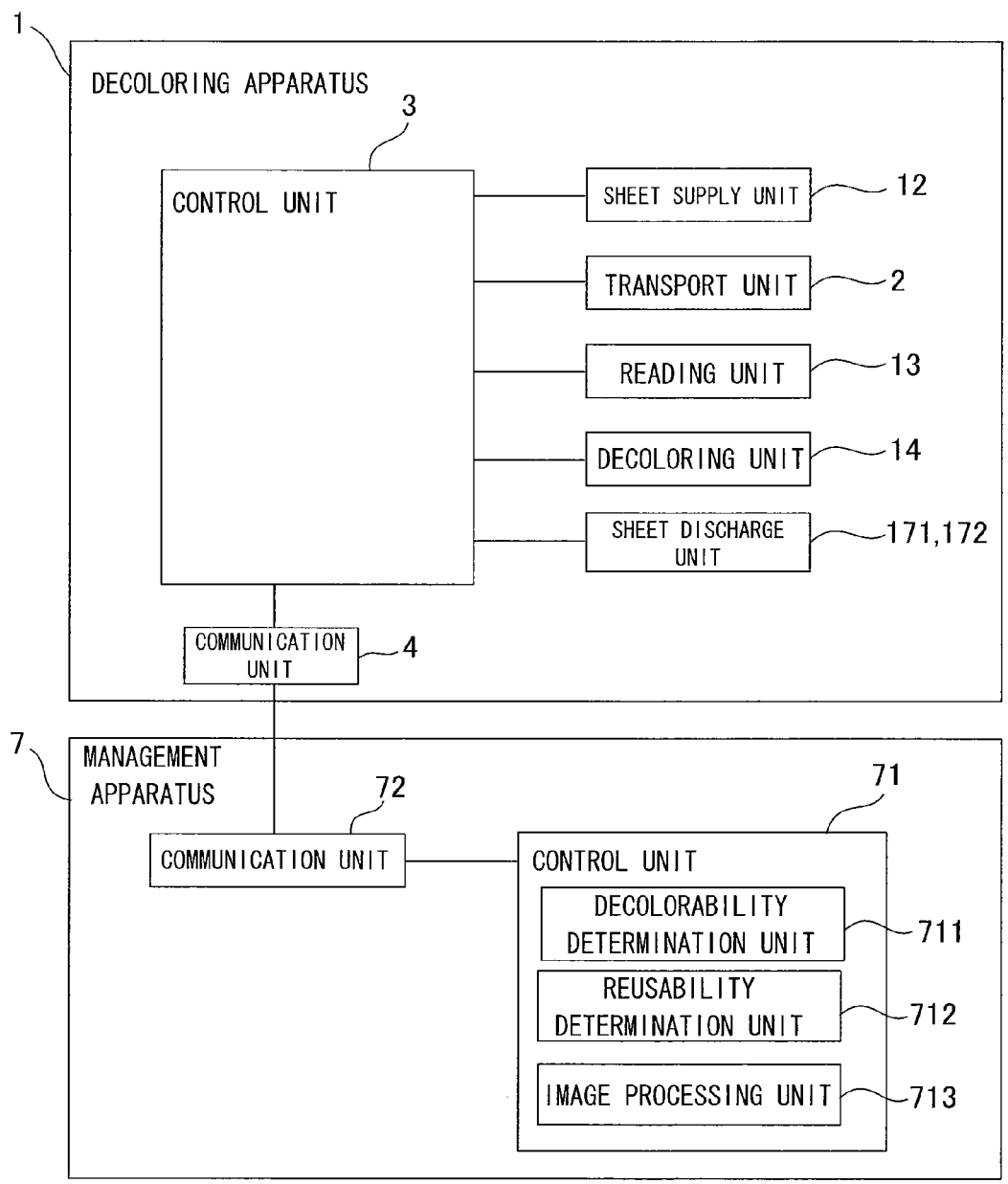
FIG. 2 is a block diagram of a decoloring apparatus and a management apparatus.

FIG. 2 is a block diagram of the decoloring apparatus 1 and the management apparatus 7.

The functions of the control unit 3 will be described later in detail.

The communication unit 4 receives a result of the determination regarding the reusability, which is generated by the management apparatus 7 based on the image data, from the management apparatus 7.

The management apparatus 7 is a general PC and provided with a control unit 71 and a communication unit 72.

The control unit 71 includes a processor, an ASIC, a memory, and an HDD and controls the whole management apparatus 7. The control unit 71 includes as a functional unit a receiving time indicating data transmission unit 710 which transmits to the decoloring apparatus 1 receiving time indicating data which indirectly indicates the time until the decoloring apparatus 1 receives the result of the determination regarding the decolorability and the result of the determination regarding the reusability (which is used for calculation of time taken until the receiving of the determination result). In addition, the control unit 71 includes as functional units a decolorability determination unit 711 which determines whether the decoloring can be performed, a reusability determination unit 712 which determines whether the reusing can be made, and an image processing unit 713. The image processing unit 713 performs image processing on the image data received from the decoloring apparatus 1 in order to perform decolorability determination and reusability determination.

Figure 3:
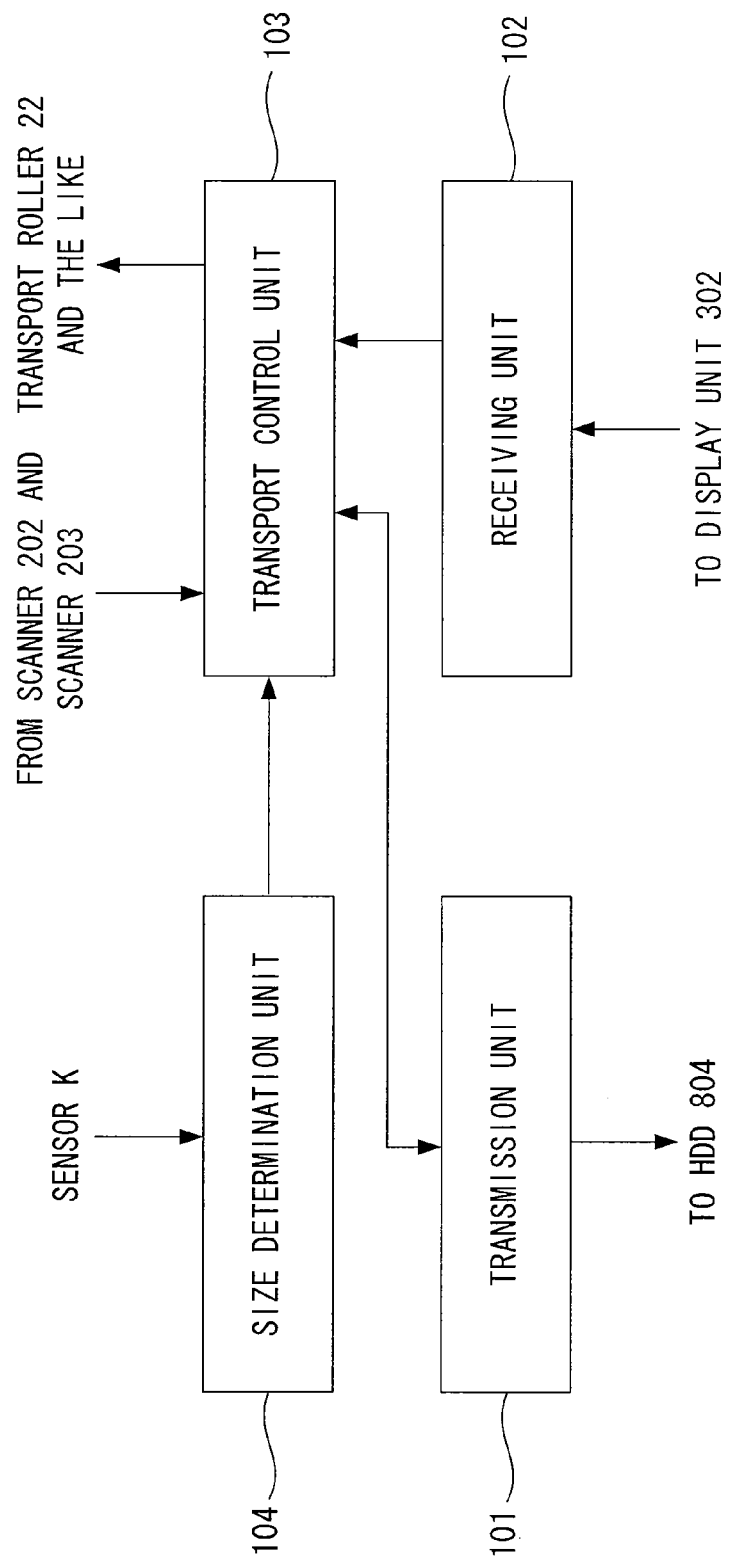
FIG. 3 is a functional block diagram showing a specific functional configuration of a control unit in a decoloring apparatus.

FIG. 3 is a functional block diagram showing a specific functional configuration of the control unit 3 in the decoloring apparatus 1.

The decoloring apparatus 1 includes a transmission unit 101, a receiving unit 102, a transport control unit 103, and a size determination unit 104.

The transmission unit 101 transmits the image data read by the image reading unit 13 to the management apparatus 7.

The receiving unit 102 receives the result of the determination of the decolorability determination processing performed by the decolorability determination unit 701 on the side of the management apparatus 7 regarding whether to perform the decoloring processing by the decoloring processing unit on the sheet for which image data was read, based on the image data transmitted from the transmission unit 101.

The transport control unit 103 controls the sheet supply unit 12 and the transport roller 22 and adjust the sheet transport time intervals for secondly or later transported sheets based on the time period (delay time) from the transmission of the image data for the firstly transported sheet from the transmission unit 101 to the receiving of the determination result for the firstly transported sheet by the receiving unit 102, if the image reading unit 13 is made to sequentially read images on three or more sheets. As a transport control method by the transport control unit 103 at this time, sheet supply timing for the subsequent sheets and a transport speed of the transport roller group or the like in accordance with the delay time may be stored as a data table in the HDD 804, and the control may be performed based on the obtained delay time with reference to the table, or control may be performed by performing computation in consideration of a transport distance, a rear end position of the previous sheet, or the like every time the delay time is obtained.

The size determination unit 104 determines the size of the three or more sheets as the targets of the image reading by the image reading unit 13 in the sheet transport direction. Specifically, the size determination unit 104 detects the leading end and the rear end of the transported sheet by an optical sensor K arranged on the sheet transport path and calculates the length of the sheet in the transport direction based on the passing time.

Specifically, the transport control unit 103 controls the sheet transport time intervals for secondly or later transported sheets by adjusting the timing at which the each of the secondly or later transported sheets is supplied to the sheet transport path, for example.

In addition, the transport control unit 103 controls the sheet transport time intervals for secondly or later transported sheets by adjusting the sheet transport speed of the each of the secondly or later transported sheets at the time of sheet transport, for example.

It is matter of course that the transport control unit 103 may control the sheet transport time intervals by adjusting both the sheet supply timing and the sheet transport speed.

The transport control unit 103 controls the sheet transport time intervals for three or more sequentially transported sheets such that the leading end of the subsequently transported sheet does not overtake the rear end of the just transported sheet.

In addition, the transport control unit 103 also performs transport control on the sheet transport time interval between the firstly transported sheet and the secondly transported sheet if it is determined that the size of the three or more sheets as the targets of the image reading by the image reading unit 13 in the sheet transport direction is a second size (A3, for example) which is longer than "a first size, with which a plurality of sheets can be transported at the same time, within a range from the image reading unit 13 to the decoloring processing unit in the sheet transport direction" (A4, for example).

Moreover, the transport control unit 103 can control the sheet transport time intervals for secondly or later transported sheets based on the reading resolution (dots per inch, for example) at the time of image reading by the image reading unit 13 and the time period from the transmission of the image data from the transmission unit 101 until the receiving of the determination result for the firstly transported sheet by the receiving unit 102. It is desirable to perform transport control in consideration of a scanner resolution in order to more precisely control the intervals between sheets since the delay due to the image processing in accordance with the resolution of the scanner is also a factor affecting the throughput of the sheet transport as well as the delay due to the computation time by the management apparatus 7.

Figure 4:
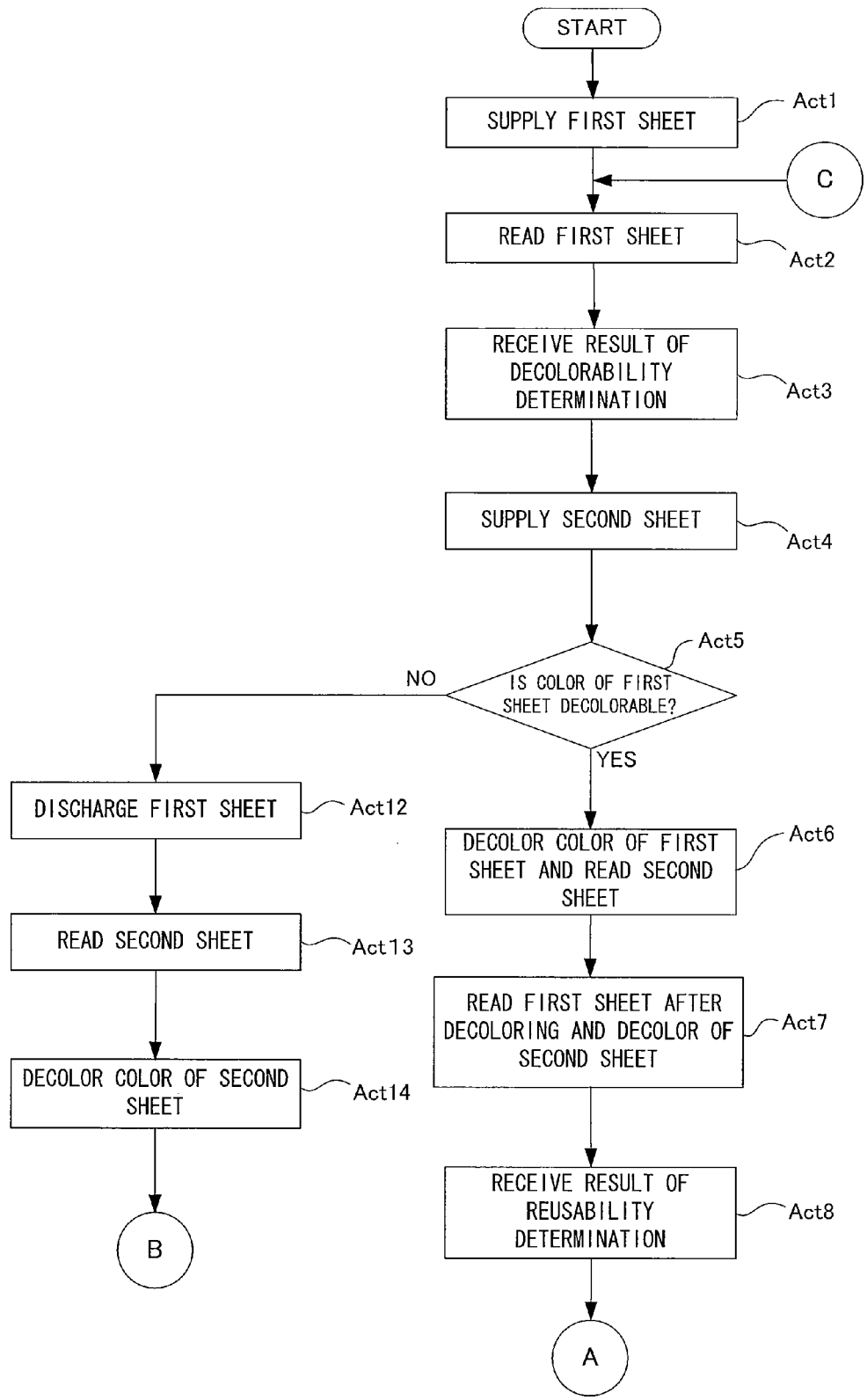
FIG. 4 is a flowchart for illustrating a flow of decoloring processing by a decoloring apparatus.
Figure 5:
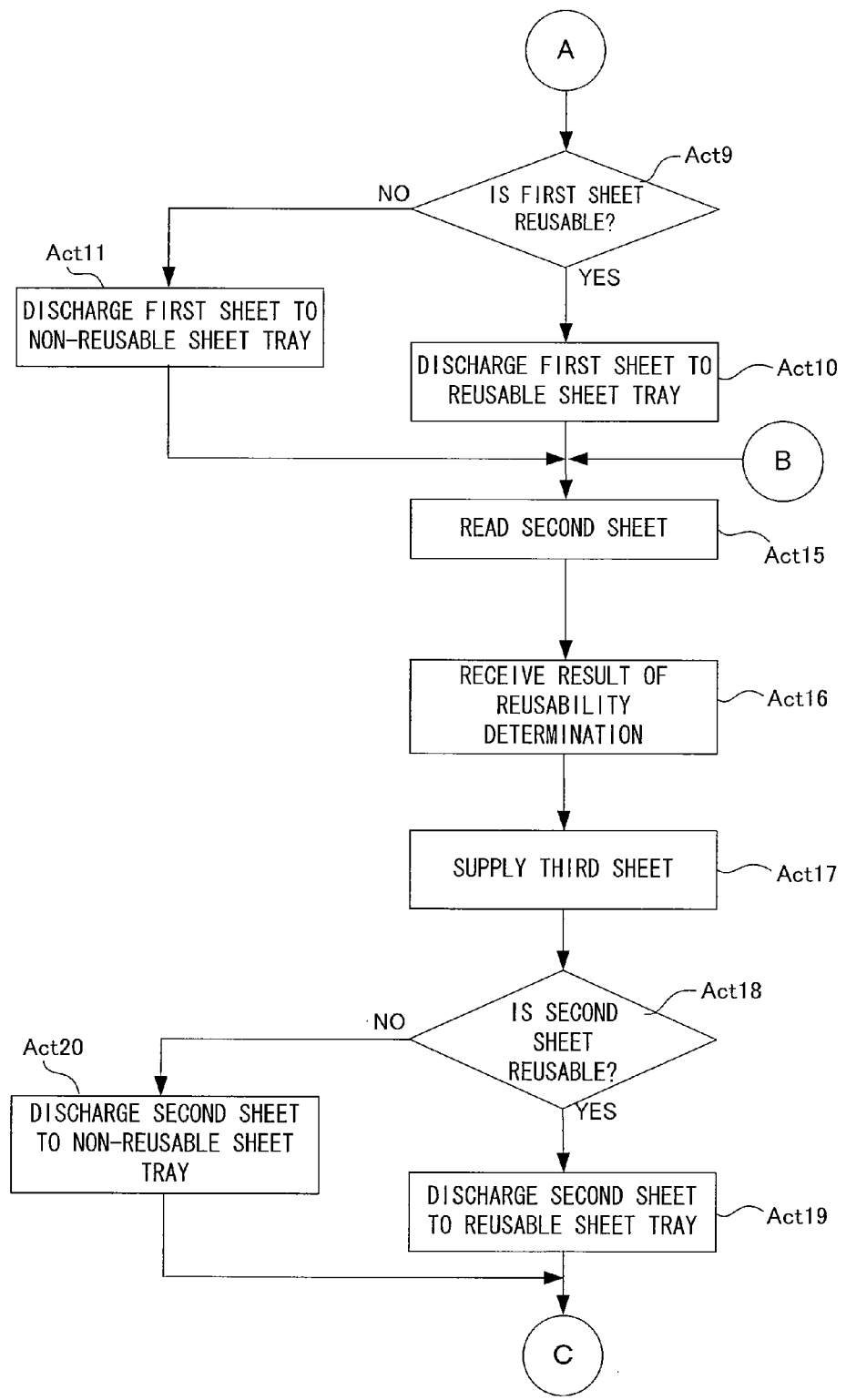
FIG. 5 is a flowchart for illustrating a flow of decoloring processing by a decoloring apparatus.
Figure 6:
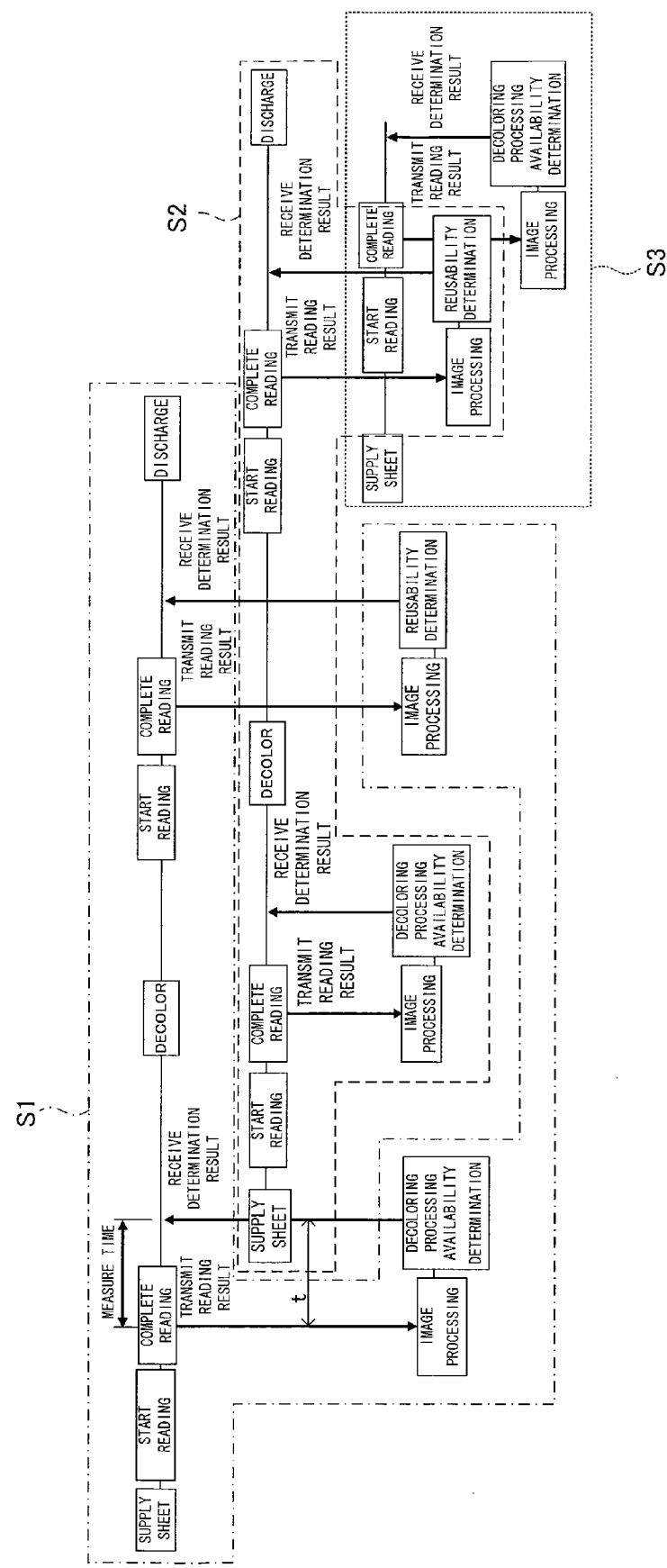
FIG. 6 is a transition diagram showing a flow of processing when decoloring processing is sequentially performed for three sheets.
Figure 7:
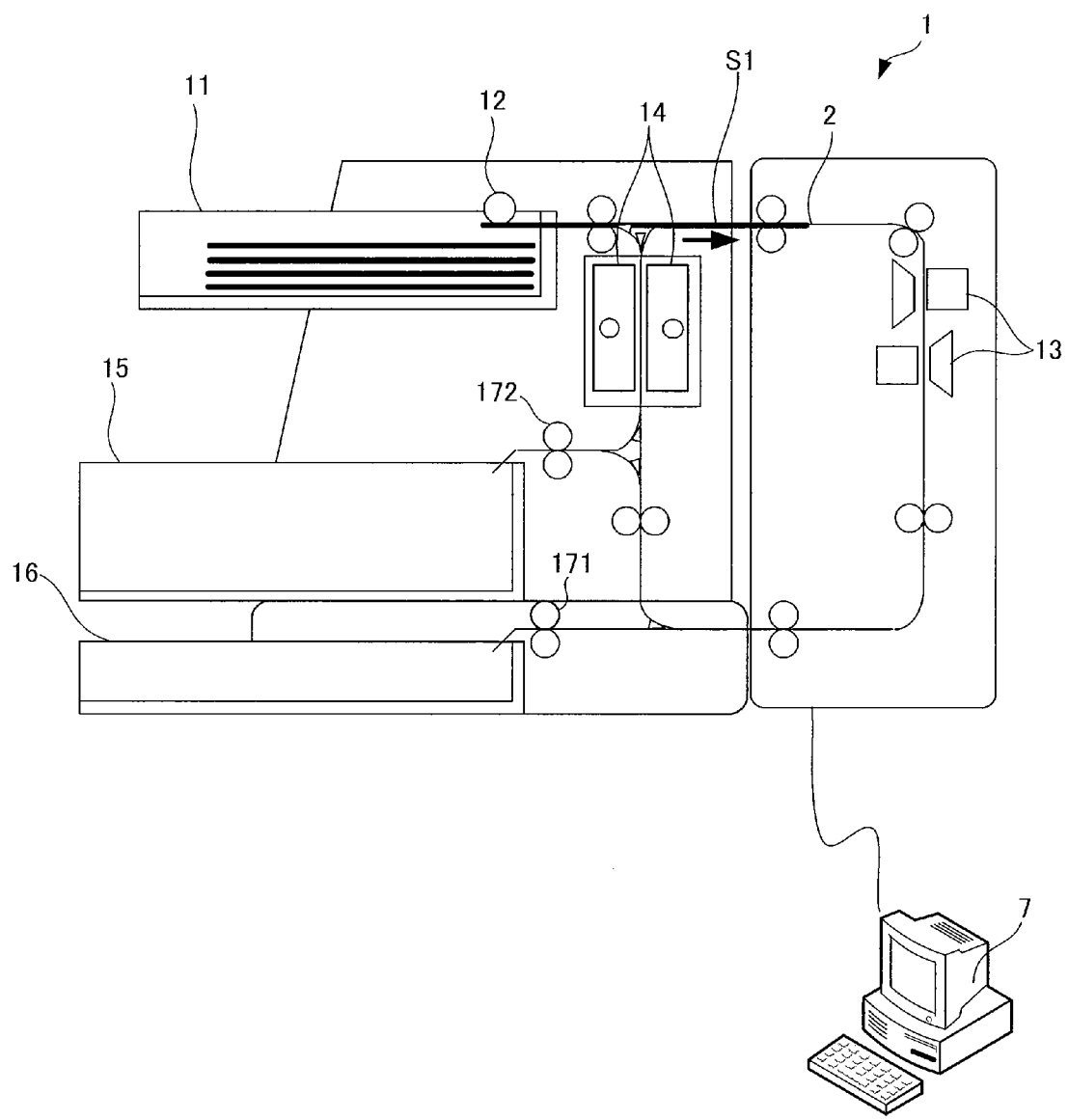
FIG. 7 is a conceptual diagram for illustrating a flow of sheet transport control by a decoloring apparatus.

Hereinafter, description will be made of the flow of the decoloring processing by the decoloring apparatus 1 with reference to the flowcharts in FIGS. 4 and 5. FIG. 6 is a transition diagram showing the processing flow when the decoloring processing is sequentially performed on three sheets. In FIG. 6, a dash-dotted chain line represents processing regarding a sheet S1, a dashed line represents processing regarding a sheet S2, and a dotted line represents processing regarding a sheet S3. In addition, FIGS. 7 to 12 are conceptual diagrams for illustrating the flow of the sheet transport control in the decoloring apparatus 1.

The decoloring apparatus 1 performs decoloring processing by reading the program, which is permanently stored in the memory 803, by the processor 801.

The control unit 3 in the decoloring apparatus 1 causes the sheet supply unit 12 to receive the first sheet S1 (previous sheet), on which an image is formed with decolorable colorant, from the sheet supply tray 11 (FIG. 7) and supply the sheet to the transport path 2 (Act 1).

Figure 8:
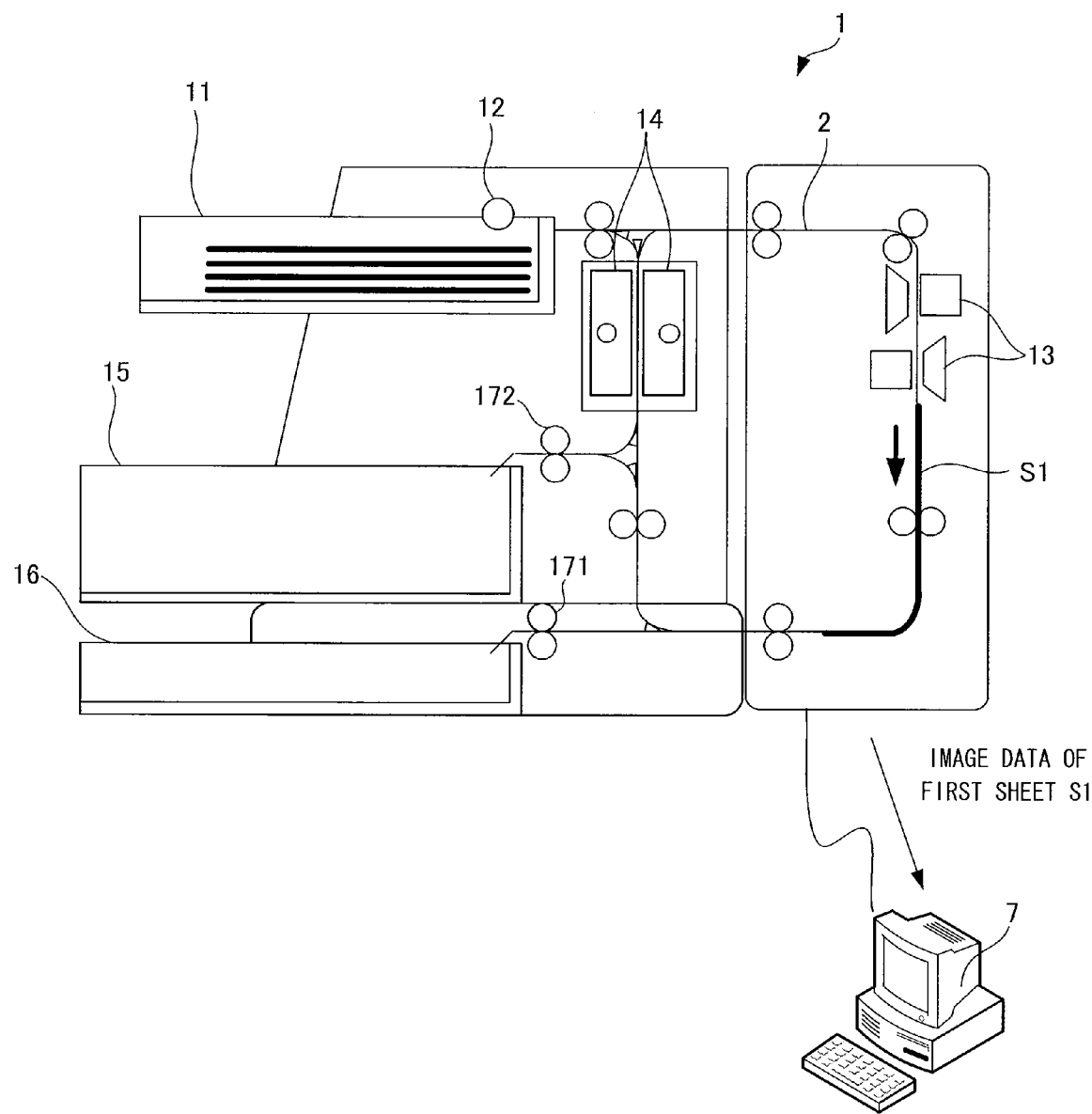
FIG. 8 is a conceptual diagram for illustrating a flow of sheet transport control by a decoloring apparatus.

The control unit 3 causes the image reading unit 13 to read the image on the first sheet S1 and sends the image data to the management apparatus 7 via the communication unit 4 as shown in FIG. 8 (Act 2). The control unit 3 causes the sheet, whose image was read, to wait between the image reading unit 13 and the decoloring processing unit 14 in the transport path 2.

The management apparatus 7 performs image processing on the image data, determines based on the image data for which the image processing was performed whether or not prohibition data (characters such as "confidential data", "internal consumption only", and the like obtained by OCR processing) such as confidential data for which decoloring is to be prohibited is included in the image data, that is, whether or not the colors on the sheet are erasable (decolorability determination), and determines the sheet transport destination.

Specifically, the management apparatus 7 determines that the color of the sheet cannot be decolored and determines that the sheet transport destination is the non-reusable sheet tray 16 if the prohibition data is included in the image data, and determines that the color of the sheet is erasable and determines that the sheet transport destination is the decoloring processing unit 14 if the prohibition data is not included in the image data.

If the result of the decolorability determination is received from the management apparatus 7 (Act 3), the control unit 3 supplies the second sheet S2 (subsequent sheet) to the transport path 2 (Act 4).

Figure 9:
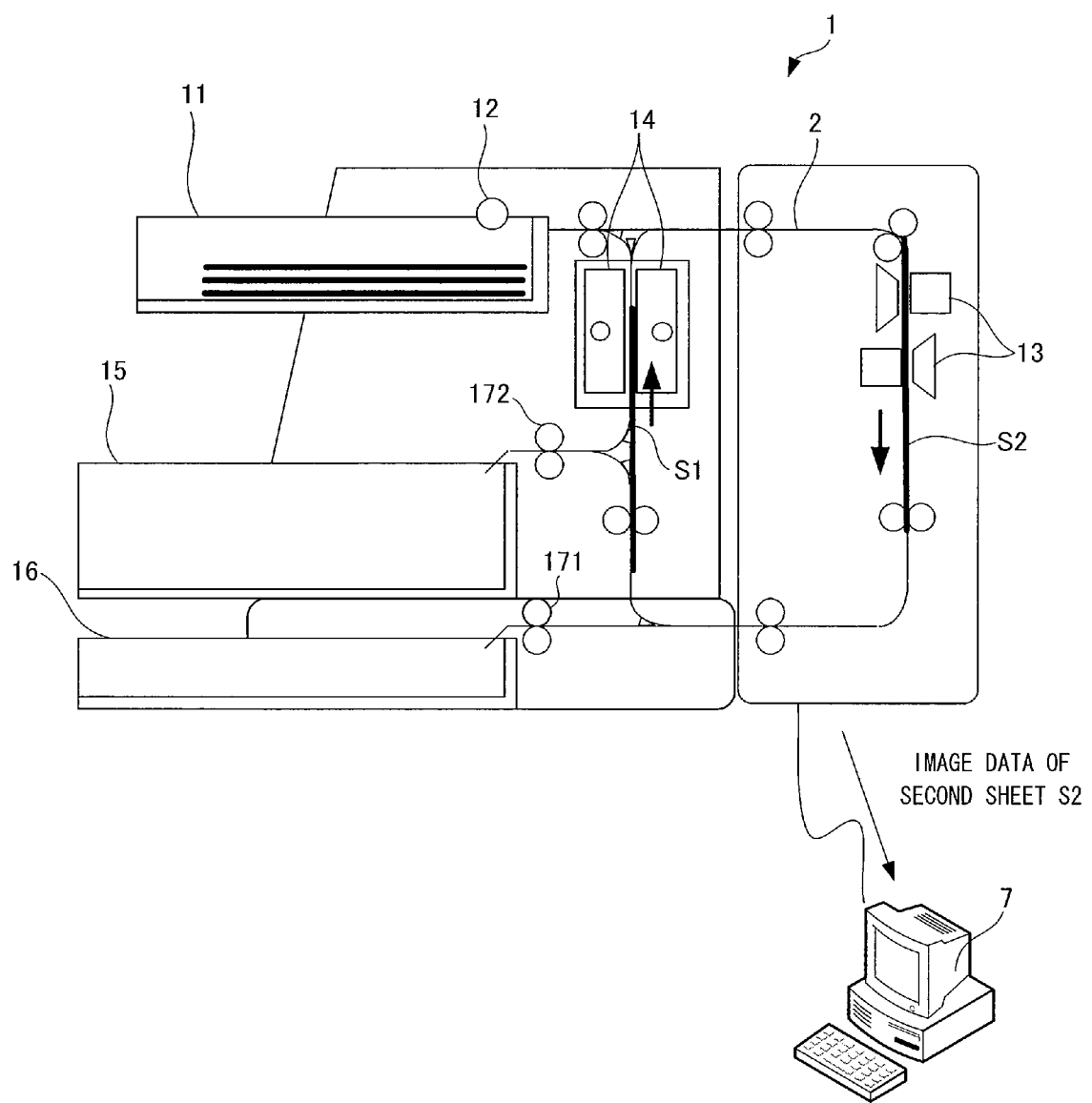
FIG. 9 is a conceptual diagram for illustrating a flow of sheet transport control by a decoloring apparatus.

The control unit 3 transports the first sheet S1, which was made to wait between the image reading unit 13 and the decoloring processing unit 14, to the decoloring processing unit 14, causes the decoloring processing unit 14 to decolor the color of the image on the sheet S1, and causes the image reading unit 13 to read the image on the second sheet S2 (Act 6) as shown in FIG. 9 if it is determined that the color of the first sheet S1 can be decolored and the transport destination is the decoloring processing unit 14 in the result of the decolorability determination (YES in Act 5)

Figure 10:
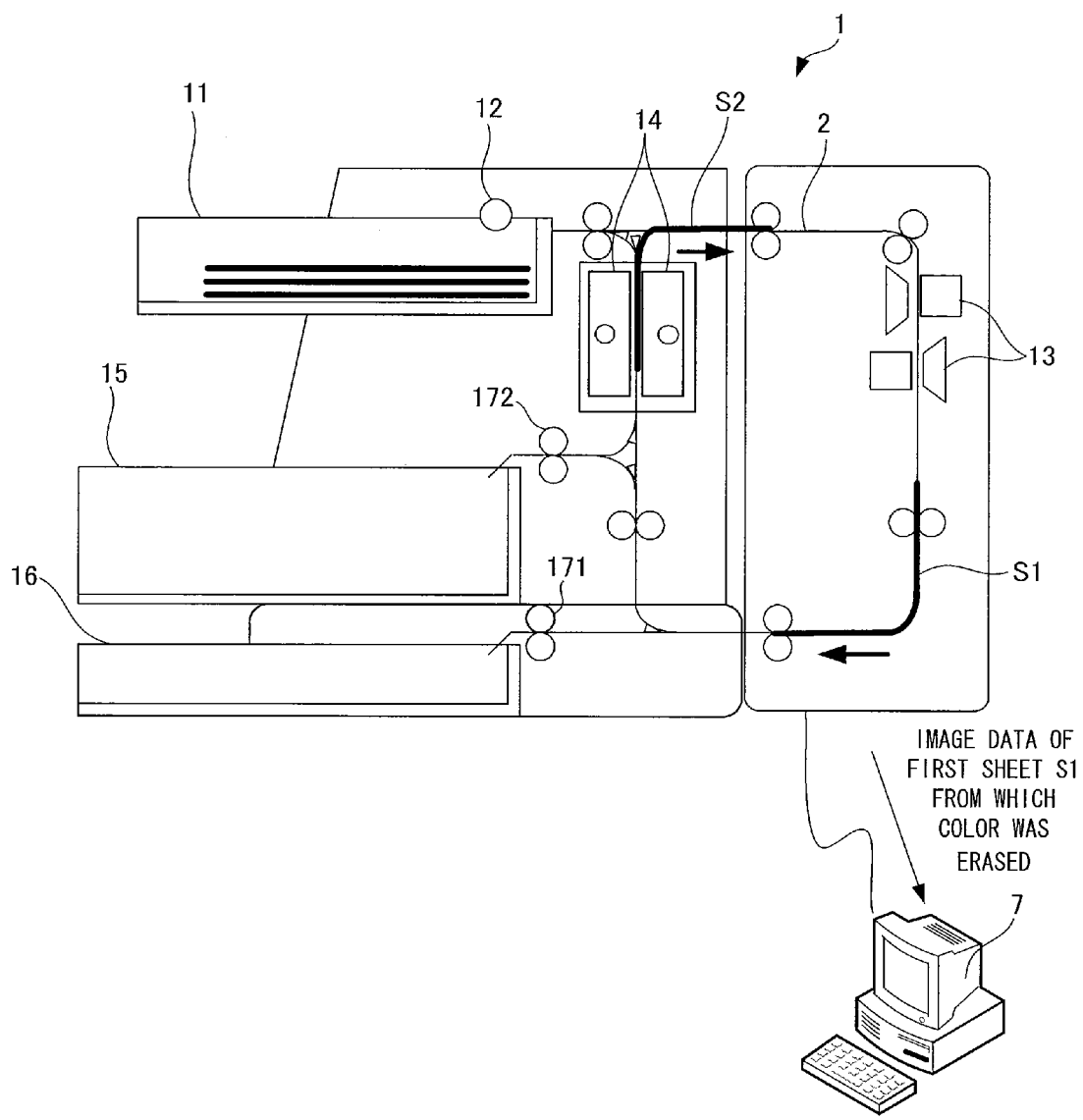
FIG. 10 is a conceptual diagram for illustrating a flow of sheet transport control by a decoloring apparatus.

The control unit 3 causes the image reading unit 13 to read the surface, from which the color was decolored, of the first sheet which was subjected to the decoloring processing, sends the image data to the management apparatus 7, and causes the decoloring processing unit 14 to decolor the color of the image on the second sheet S2 as shown in FIG. 10 (Act 7).

The management apparatus 7 performs image processing on the image data on the surface, from which the color was decolored, of the first sheet S1. Then, the management apparatus 7 performs reusability determination in which it is determined that the first sheet S1 is reusable and the transport destination is the reusable sheet tray 15 if the amount of the color remaining on the first sheet S1 after the decoloring (a concentration value of the image, for example) is a predetermined amount or smaller and it is determined that the first sheet S1 cannot be reused and the transport destination is the non-reusable sheet tray 16 if the amount of the color remaining on the sheet is a predetermined amount or larger, based on the image data which was subjected to the image processing and the determination result is transmitted to the decoloring apparatus 1.

The control unit 3 receives the reusability determination result (Act 8).

Figure 11:
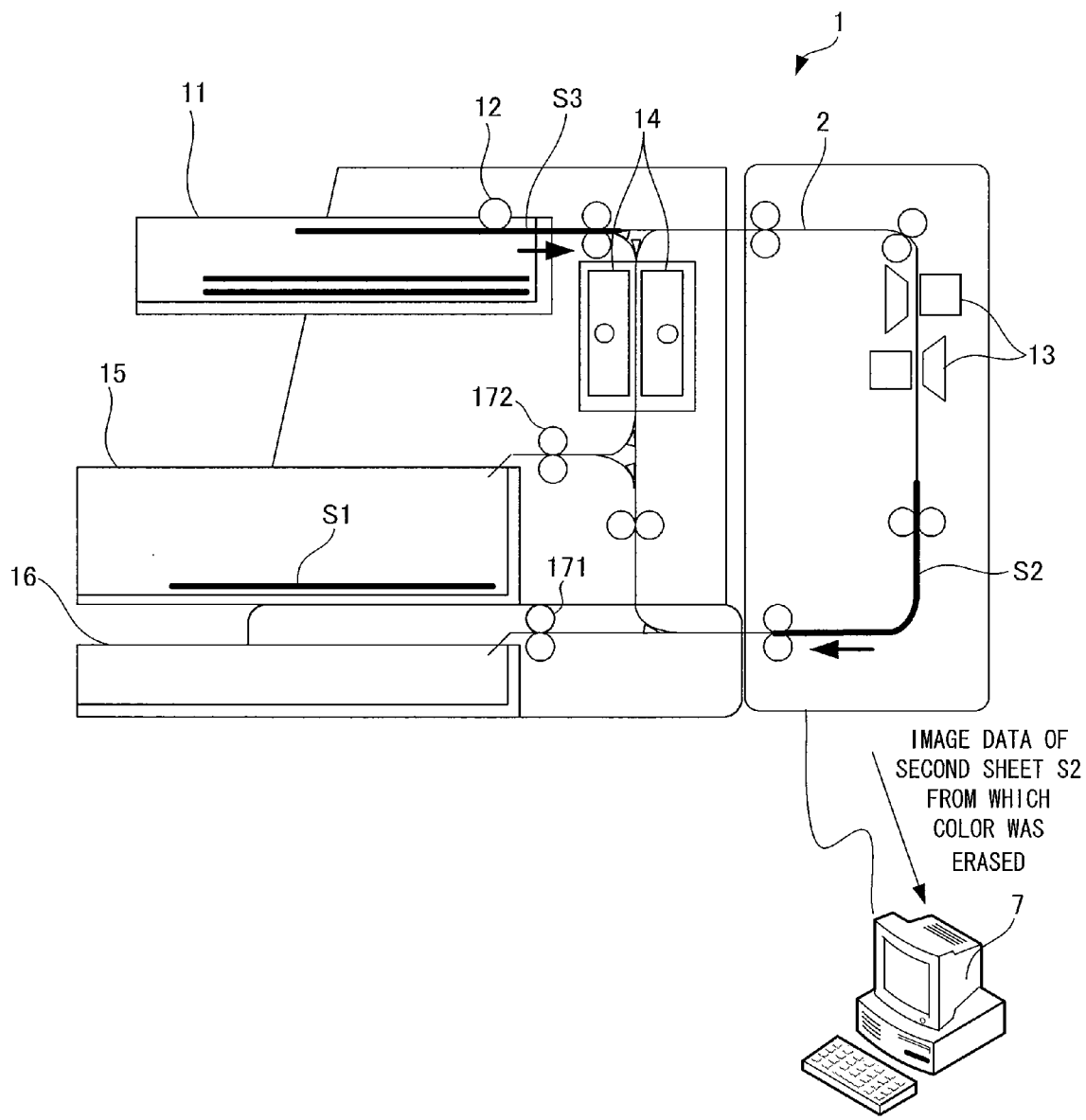
FIG. 11 is a conceptual diagram for illustrating a flow of sheet transport control by a decoloring apparatus.

The control unit 3 causes the sheet discharge unit 172 to discharge the first sheet S1 to the reusable sheet tray 15 (Act 10) if it is determined that the first sheet S1 is reusable and the transport destination is the reusable sheet tray 15 (YES in Act 9) as shown in FIG. 11. The control unit 3 causes the sheet discharge unit 171 to discharge the first sheet S1 to the non-reusable sheet tray 16 (Act 11) if it is determined that the first sheet S1 cannot be reused and the transport destination is the non-reusable sheet tray 16 (NO in Act 9).

The control unit 3 discharges the first sheet S1 (Act 10, Act 11), causes the image reading unit 13 to read the surface, from which the color was decolored, of the second sheet S2 which was subjected to the decoloring processing, and sends the image data to the management apparatus 7 (Act 15).

In addition, the control unit 3 discharges the first sheet S1, which was made to wait between the image reading unit 13 and the decoloring processing unit 14, to the non-reusable sheet tray 16 (Act 12) if it is determined that the color of the first sheet S1 cannot be decolored and the transport destination is the non-reusable sheet tray 16 in the result of the decolorability determination (NO in Act 5). Subsequently, the control unit 3 causes the image reading unit 13 to read the image on the second sheet S2 (Act 13) and causes the decoloring processing unit 14 to decolor the color of the image on the second sheet S2 (Act 14). The surface, from which the color was decolored, of the second sheet S2 which was subjected to the decoloring processing is then read by the image reading unit 13, and the image data is transmitted to the management apparatus 7 (Act 15).

The management apparatus 7 performs reusability determination for determining the transport destination of the second sheet S2 depending on whether or not the second sheet S2 is reusable based on the image data and transmits the determination result to the decoloring apparatus 1.

The control unit 3 receives the result of the reusability determination (Act 16).

The control unit 3 supplies the third sheet S3 to the transport path 2 (Act 17) and discharges the second sheet S2 to one of the sheet trays 15 and 16 based on the result of the reusability determination (Act 18, Act 19) as shown in FIG. 11 after receiving the result of the reusability determination.

As the timing at which the sheet S3 is supplied, the time from the transmission of the reading result by the image reading unit 13 regarding the first sheet S1 to the management apparatus 7 until the receiving of the determination result from the management apparatus 7 (the time period t in FIG. 6) is measured, and the thirdly or later transported sheets are supplied at sheet supply timing at which the subsequent sheet does not overtake the previous sheet in consideration of the measured time period.

Thereafter, the processing returns to Act 2, and the control unit 3 performs the same processing as that for the first sheet S1 on the third sheet S3 and performs the same processing as that for the second sheet S2 on the fourth sheet (Act 2 to Act 19).

Figure 12:
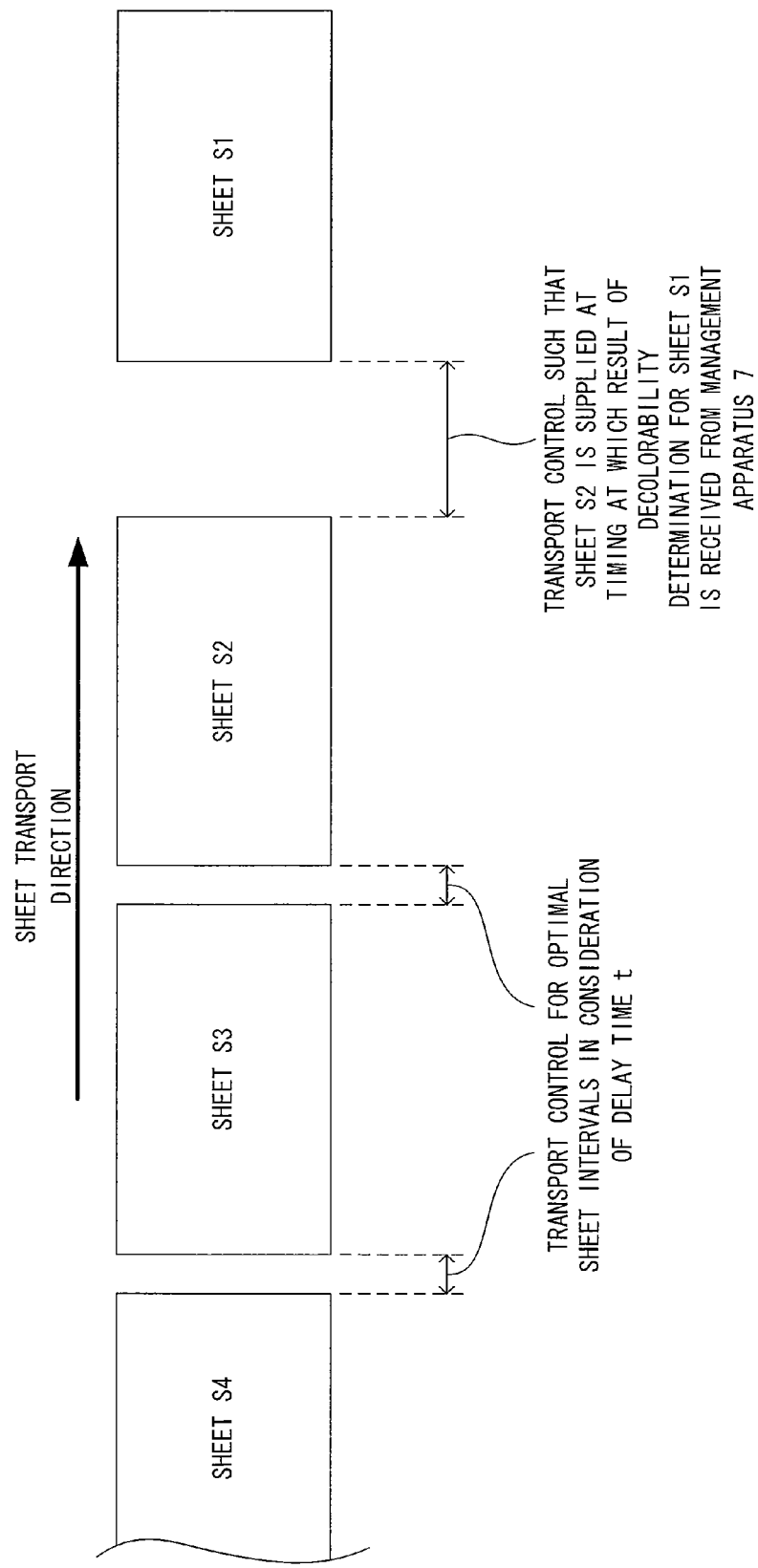
FIG. 12 is a conceptual diagram for illustrating a flow of sheet transport control by a decoloring apparatus.

As shown in FIG. 12, the control unit 3 can control the intervals between sheets, which is optimal throughput in consideration of the delay time, without causing the subsequent sheet to collide against the previous sheet since the control unit 3 adjusts the intervals for secondly or later transported sheets to be optimal intervals based on the delay time t from the transmission of the image data read from the firstly transported sheet S1 to the management apparatus 7 until the receiving of the determination result, according to this embodiment.

Since the unit U1 provided with basic functions as the decoloring apparatus and the unit U2 provided with a scanner for performing decoloring completion determination and the decolorability determination are provided as separated units, a user who desires only the basic functions as the decoloring apparatus may get only the unit U1, and it is possible to provide functions, which the user desires, with the costs corresponding to the functions.

FIG. 13 shows an example of a data table referred to by the control unit 3 when the thirdly or later transported sheets S3 are supplied. In this embodiment, this data table is stored in the HDD 804.

Modified Example

Figure 14:
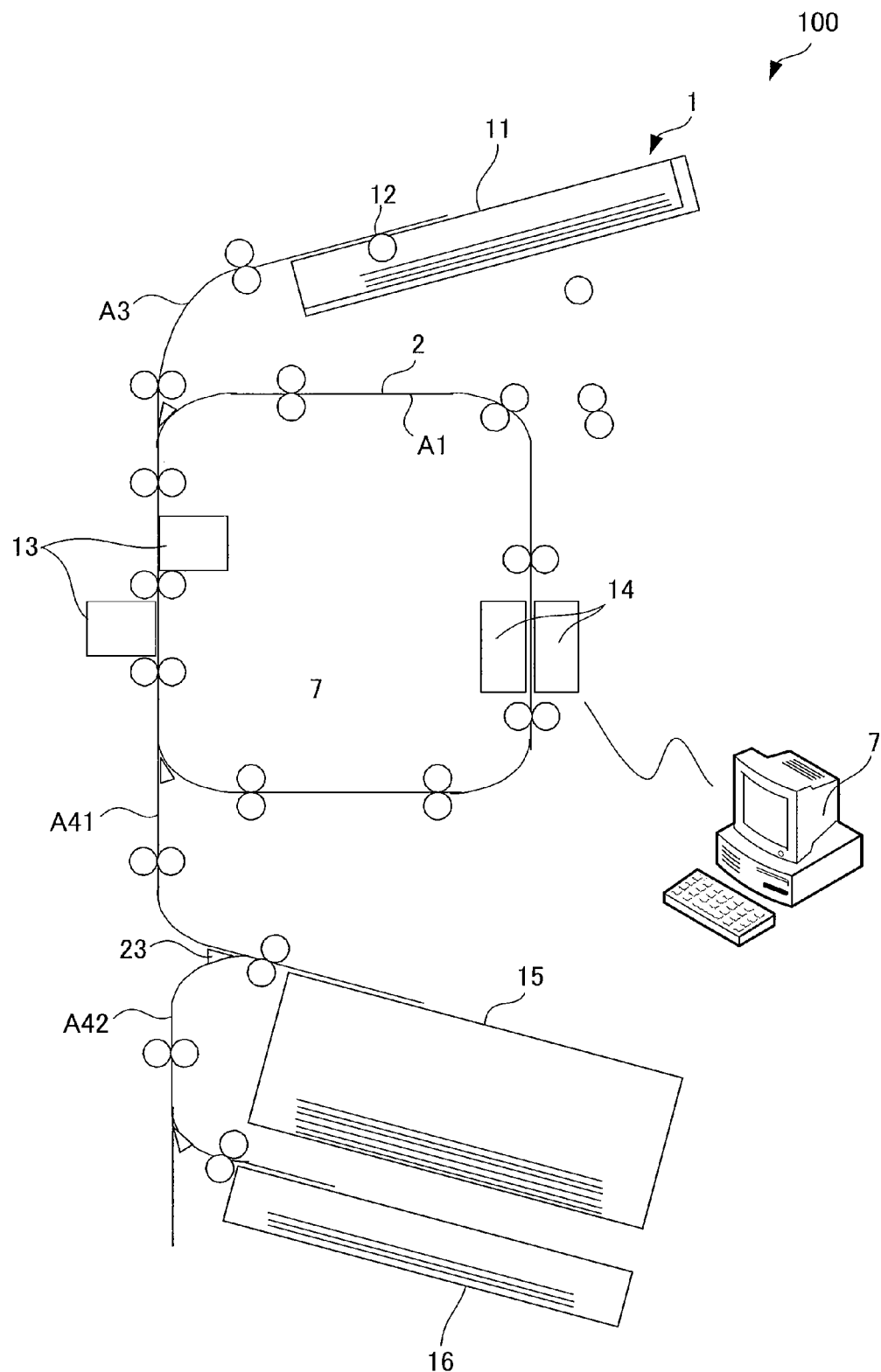
FIG. 14 is a diagram showing a modified example of a decoloring apparatus.

FIG. 14 shows a modified example of the above embodiment.

Although the decoloring apparatus according to the modified example shown in the drawing includes a sheet transport path which is completely different from that in the decoloring apparatus shown in FIG. 1 and the like, the provided functional parts are the same as those in the decoloring apparatus shown in FIG. 1 and the like.

In this embodiment, the meting point of the transport path A3 from the sheet supply unit 12 to the ring-shaped transport path A1 and the ring-shaped transport path A1 is not on the side of the decoloring processing unit 14 but on the side of the image reading unit 13. In addition, the reusable sheet tray 15 is connected between the image reading unit 13 and the decoloring processing unit 14 in the ring-shaped transport path A1 by the discharge transport path A41. The non-reusable sheet tray 16 is on the downstream side of the reusable sheet tray 15 in the transport direction in the transport path 2B and connected by the reusable sheet tray 15 and the discharge transport path A42. The decoloring apparatus according to this modified example can perform the same decoloring processing as that in the above embodiment.

Furthermore, it is possible to provide a program which causes a computer configuring the decoloring apparatus to execute each of the aforementioned operations. Although the description was made of an example in which the program for realizing the functions of an exemplary embodiment were recorded in advance in the storage area provided in the apparatus in this embodiment, the exemplary embodiment is not limited thereto, the same program may be downloaded from a network to the apparatus, or the same program recorded in a computer-readable recording medium may be installed on the apparatus. Any recording medium may be used as long as the recording medium can record the program and is a computer-readable recording medium. Specifically, an internal recording apparatus which is internally mounted in the computer such as a ROM, a RAM, or the like, a portable recording medium such as a CD-ROM, a flexible disc, a DVD disc, a magneto optical disc, an IC card, or the like, a database which retains a computer program, another computer and the database thereof, a transmission medium online, or the like can be exemplified as the recording medium. In addition, the functions installed or downloaded in advance may be realized in cooperation with the OS (operating system) or the like in the apparatus.

In addition, some or all of the programs may be execution modules which are dynamically generated.

Moreover, it is needless to say that at least a part of the various kinds of the processing realized by executing the program by the processor in each of the aforementioned embodiments can be executed as circuits by the ASIC 802.

According to the technique described in this specification, it is possible to realize effective sheet transport control in a decoloring apparatus in consideration of a computation speed and the like of an external apparatus if decolorability determination is made based on a read image from a sheet in the external apparatus which can communicate with the erasing apparatus, as described above in detail.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A decoloring apparatus comprising:
an image reading unit which reads an image on a transported sheet;
a decoloring processing unit which is positioned on the downstream side of the image reading unit in a sheet transport direction and decolors colors of an image formed on the sheet with decolorable colorant;
a transmission unit which transmits image data read by the image reading unit to a predetermined management apparatus;
a receiving unit which receives a result of determination processing which is performed on the side of the management apparatus regarding whether to perform decoloring processing by the decoloring processing unit on a sheet, from which image data was read, based on the image data transmitted by the transmission unit; and
a transport control unit which controls sheet transport time intervals for secondly or later transported sheets based on a time period from transmission of the image data of a firstly transported sheet by the transmission unit until receiving of the determination result for the firstly transported sheet by the receiving unit if the image reading unit is caused to sequentially read images on three or more sheets.

2. The apparatus according to claim 1,
wherein the transport control unit controls the sheet transport time intervals for secondly or later transported sheets by adjusting sheet supply timing for each of the secondly or later transported sheets to a sheet transport path.

3. The apparatus according to claim 1,
wherein the transport control unit controls the sheet transport time intervals for secondly or later transported sheets by adjusting a sheet transport speed for each of the secondly or later transported sheets at the time of sheet transport.

4. The apparatus according to claim 1,
wherein the transport control unit controls sheet transport time intervals such that the leading end of the subsequently transported sheet does not overtake the rear end of the just transported sheet in regards to three or more sheets which are sequentially transported.

5. The apparatus according to claim 1, further comprising:
a size determination unit which determines a size of three or more sheets as targets of image reading by the image reading unit in the sheet transport direction,
wherein the transport control unit further controls the sheet transport time interval between a firstly transported sheet and a secondly transported sheet if it is determined that the size of the three or more sheets as the targets of the image reading by the image reading unit in the sheet transport direction is a second size which is longer than a first size, with which a plurality of sheets can be transported at the same time within a range from the image reading unit to the decoloring processing unit in the sheet transport direction.

6. The apparatus according to claim 1,
wherein the transport control unit controls the sheet transport time intervals for secondly or later transported sheets based on reading resolution at the time of image reading by the image reading unit and a time period from transmission of the image data from the transmission unit until receiving of the determination result for the firstly transported sheet by the receiving unit.

7. A decoloring apparatus comprising:
image reading means for reading an image on a transported sheet;
decoloring processing means, which is positioned further on the downstream side than the image reading means in a sheet transport direction, for erasing colors of an image formed on the sheet with decolorable colorant;
transmission means for transmitting image data read by the image reading means to a predetermined management apparatus;
receiving means for receiving a result of determination processing which is performed at the side of the management apparatus regarding whether to perform decoloring processing by the decoloring processing means on a sheet, from which image data was read, based on the image data transmitted by the transmission means; and
transport control means for controlling sheet transport time intervals for secondly or later transported sheets based on a time period from transmission of the image data of a firstly transported sheet by the transmission means until receiving of the determination result for the firstly transported sheet by the receiving means if the image reading means is caused to sequentially read images on three or more sheets.

8. The apparatus according to claim 7,
wherein the transport control means controls the sheet transport time intervals for secondly or later transported sheets by adjusting sheet supply timing for each of the secondly or later transported sheets to a sheet transport path.

9. The apparatus according to claim 7,
wherein the transport control means controls the sheet transport time intervals for secondly or later transported sheets by adjusting a sheet transport speed for each of the secondly or later transported sheets at the time of sheet transport.

10. The apparatus according to claim 7,
wherein the transport control means controls sheet transport time intervals such that the leading end of the subsequently transported sheet does not overtake the rear end of the just transported sheet in regards to three or more sheets which are sequentially transported.

11. The apparatus according to claim 7, further comprising:
a size determination means for determining a size of three or more sheets as targets of image reading by the image reading means in the sheet transport direction,
wherein the transport control means further controls the sheet transport time interval between a firstly transported sheet and a secondly transported sheet if it is determined that the size of the three or more sheets as the targets of the image reading by the image reading means in the sheet transport direction is a second size which is longer than a first size, with which a plurality of sheets can be transported at the same time within a range from the image reading means to the decoloring processing means in the sheet transport direction.

12. The apparatus according to claim 7,
wherein the transport control means controls the sheet transport time intervals for secondly or later transported sheets based on reading resolution at the time of image reading by the image reading means and a time period from transmission of the image data from the transmission means until receiving of the determination result for the firstly transported sheet by the receiving means.

13. A sheet transport control method in a decoloring apparatus including an image reading unit which reads an image on a transported sheet and a decoloring processing unit which is positioned further on the downstream side than the image reading unit in a sheet transport direction and decolors colors of an image formed on the sheet with decolorable colorant, the method comprising:
transmitting image data read by the image reading unit to a predetermined management apparatus;
receiving a result of determination processing which is performed on the side of the management apparatus regarding whether to perform decoloring processing by the decoloring processing unit on a sheet, from which image data was read, based on the transmitted image data; and
controlling sheet transport time intervals for secondly or later transported sheets based on a time period from transmission of the image data of a firstly transported sheet by the transmission unit until receiving of the determination result for the firstly transported sheet by the receiving unit if the image reading unit is caused to sequentially read images on three or more sheets.

14. The method according to claim 13,
wherein the sheet transport time intervals for secondly or later transported sheets are controlled by adjusting sheet supply timing for each of the secondly or later transported sheets to a sheet transport path.

15. The method according to claim 13,
wherein the sheet transport time intervals for secondly or later transported sheets are controlled by adjusting a sheet transport speed for each of the secondly or later transported sheets at the time of sheet transport.

16. The method according to claim 13,
wherein sheet transport time intervals are controlled such that the leading end of the subsequently transported sheet does not overtake the rear end of the just transported sheet in regards to three or more sheets which are sequentially transported.

17. The method according to claim 13, further comprising:
determining a size of three or more sheets as targets of image reading by the image reading unit in the sheet transport direction,
wherein the sheet transport time interval between a firstly transported sheet and a secondly transported sheet is further controlled if it is determined that the size of the three or more sheets as the targets of the image reading by the image reading unit in the sheet transport direction is a second size which is longer than a first size, with which a plurality of sheets can be transported at the same time within a range from the image reading unit to the decoloring processing unit in the sheet transport direction.

18. The method according to claim 13,
wherein the sheet transport time intervals for secondly or later transported sheets are controlled based on reading resolution at the time of image reading by the image reading unit and a time period from transmission of the image data from the transmission unit until receiving of the determination result for the firstly transported sheet by the receiving unit.

* * * * *